(12) United States Patent
Thompson

(10) Patent No.: US 11,590,691 B2
(45) Date of Patent: Feb. 28, 2023

(54) PLATE-BASED ADDITIVE MANUFACTURING APPARATUS AND METHOD

(71) Applicant: General Electric Company, Schenectady, NY (US)

(72) Inventor: Mary Kathryn Thompson, North Huntingdon, PA (US)

(73) Assignee: General Electric Company, Schenectady, NY (US)

( * ) Notice: Subject to any disclaimer, the term of this patent is extended or adjusted under 35 U.S.C. 154(b) by 175 days.

(21) Appl. No.: 15/802,290

(22) Filed: Nov. 2, 2017

(65) Prior Publication Data
US 2019/0126533 A1 May 2, 2019

(51) Int. Cl.
*B29C 64/124* (2017.01)
*B29C 64/205* (2017.01)
(Continued)

(52) U.S. Cl.
CPC .......... *B29C 64/124* (2017.08); *B29C 64/129* (2017.08); *B29C 64/205* (2017.08);
(Continued)

(58) Field of Classification Search
CPC ... B29C 64/129; B29C 64/205; B29C 64/124; B33Y 10/00; B33Y 30/00; B33Y 40/00; B33Y 50/02; B33Y 64/35
See application file for complete search history.

(56) References Cited

U.S. PATENT DOCUMENTS

| 4,575,330 A | 3/1986 | Hull |
| 4,752,498 A | 6/1988 | Fudim |

(Continued)

FOREIGN PATENT DOCUMENTS

| WO | 9806560 | 2/1998 |
| WO | 2006077665 | 7/2006 |

(Continued)

OTHER PUBLICATIONS

Tassilo Mortiz, Saeed Maleksaeedi, Additive Manufacturing of Ceramic Components, Additive Manufacturing , 2018, Sceince Direct , Ch-4.2.2.1, pp. 131-132. (Year: 2018).*

(Continued)

*Primary Examiner* — Alison L Hindenlang
*Assistant Examiner* — Debjani Roy
(74) *Attorney, Agent, or Firm* — Dority & Manning, P.A.

(57) ABSTRACT

An additive manufacturing apparatus for manufacturing a three-dimensional component includes: a build plate, at least a portion of which is transparent, the build plate defining a build surface; a material depositor operable to deposit a radiant-energy-curable resin on the build surface; a stage positioned facing the build surface of the build plate and configured to hold a stacked arrangement of one or more cured layers of the resin; one or more actuators operable to change the relative positions of the build plate and the stage; a radiant energy apparatus positioned adjacent to the build plate opposite to the stage, and operable to generate and project radiant energy on the resin through the build plate in a predetermined pattern; and a cleaning apparatus operable to remove debris from the build surface. A method is provided for use of the apparatus.

19 Claims, 11 Drawing Sheets

(51) Int. Cl.
  *B33Y 30/00* (2015.01)
  *B29C 64/245* (2017.01)
  *B33Y 10/00* (2015.01)
  *B29C 64/35* (2017.01)
  *B29C 64/129* (2017.01)

(52) U.S. Cl.
  CPC ............ *B29C 64/245* (2017.08); *B29C 64/35* (2017.08); *B33Y 10/00* (2014.12); *B33Y 30/00* (2014.12)

(56) References Cited

U.S. PATENT DOCUMENTS

| | | | |
|---|---|---|---|
| 5,026,146 A | 6/1991 | Hug et al. | |
| 5,031,120 A | 7/1991 | Pomerantz et al. | |
| 5,096,530 A | 3/1992 | Cohen | |
| 5,104,592 A | 4/1992 | Hull et al. | |
| 5,126,529 A | 6/1992 | Weiss et al. | |
| 5,174,931 A | 12/1992 | Almquist et al. | |
| 5,182,055 A | 1/1993 | Allison et al. | |
| 5,192,559 A | 3/1993 | Hull et al. | |
| 5,203,944 A | 4/1993 | Prinz et al. | |
| 5,204,055 A | 4/1993 | Sachs et al. | |
| 5,207,371 A | 5/1993 | Prinz et al. | |
| 5,258,146 A | 11/1993 | Almquist et al. | |
| 5,340,656 A | 8/1994 | Sachs et al. | |
| 5,387,380 A | 2/1995 | Cima et al. | |
| 5,432,045 A | 7/1995 | Narukawa et al. | |
| 5,454,069 A | 9/1995 | Knapp et al. | |
| 5,496,682 A | 3/1996 | Quadir et al. | |
| 5,626,919 A | 5/1997 | Chapman et al. | |
| 5,650,260 A | 7/1997 | Onishi | |
| 5,660,621 A | 8/1997 | Bredt | |
| 5,665,401 A | 9/1997 | Serbin et al. | |
| 5,697,043 A | 12/1997 | Baskaran et al. | |
| 5,718,279 A | 2/1998 | Saoth et al. | |
| 5,807,437 A | 9/1998 | Sachs et al. | |
| 5,851,465 A | 12/1998 | Bredt | |
| 5,940,674 A | 8/1999 | Sachs et al. | |
| 5,985,204 A | 11/1999 | Otsuka et al. | |
| 6,051,179 A | 4/2000 | Hagenau | |
| 6,146,567 A | 11/2000 | Sachs et al. | |
| 6,193,923 B1 | 2/2001 | Leyden et al. | |
| 6,200,646 B1 | 3/2001 | Neckers et al. | |
| 6,206,672 B1 | 3/2001 | Grenda | |
| 6,363,606 B1 | 4/2002 | Johnson et al. | |
| 6,376,148 B1 | 4/2002 | Liu et al. | |
| 6,401,002 B1 | 6/2002 | Jang et al. | |
| 6,403,002 B1 | 6/2002 | van der Geest | |
| 6,436,520 B1 | 8/2002 | Yamamoto | |
| 6,471,800 B2 | 10/2002 | Jang et al. | |
| 6,500,378 B1 | 12/2002 | Smith | |
| 6,596,224 B1 | 7/2003 | Sachs et al. | |
| 6,780,368 B2 | 8/2004 | Liu et al. | |
| 6,838,035 B1 | 1/2005 | Ederer et al. | |
| 6,850,334 B1 | 2/2005 | Gothait | |
| 6,896,839 B2 | 5/2005 | Kubo et al. | |
| 6,930,144 B2 | 8/2005 | Oriakhi | |
| 6,966,960 B2 | 11/2005 | Boyd et al. | |
| 6,986,654 B2 | 1/2006 | Imiolek et al. | |
| 7,008,209 B2 | 3/2006 | Iskra et al. | |
| 7,052,263 B2 | 5/2006 | John | |
| 7,087,109 B2 | 8/2006 | Bredr et al. | |
| 7,270,528 B2 | 9/2007 | Sherwood | |
| 7,300,613 B2 | 11/2007 | Sano et al. | |
| 7,455,804 B2 | 11/2008 | Patel et al. | |
| 7,520,740 B2 | 4/2009 | Wahlstrom et al. | |
| 7,550,518 B2 | 6/2009 | Bredt et al. | |
| 7,578,958 B2 | 8/2009 | Patel et al. | |
| 7,614,866 B2 | 11/2009 | Sperry et al. | |
| 7,636,610 B2 | 12/2009 | Schillen et al. | |
| 7,767,132 B2 | 8/2010 | Patel et al. | |
| 7,783,371 B2 | 8/2010 | John et al. | |
| 7,785,093 B2 | 8/2010 | Holmboe et al. | |
| 7,790,093 B2 | 9/2010 | Shkolnik et al. | |
| 7,795,349 B2 | 9/2010 | Bredt et al. | |
| 7,815,826 B2 | 10/2010 | Serdy et al. | |
| 7,867,302 B2 | 1/2011 | Nevoret et al. | |
| 7,892,474 B2 | 2/2011 | Shkolnik et al. | |
| 7,894,921 B2 | 2/2011 | John et al. | |
| 8,003,040 B2 | 8/2011 | El-Siblani | |
| 8,071,055 B2 | 12/2011 | Newcombe | |
| 8,110,135 B2 | 2/2012 | El-Siblani | |
| 8,126,580 B2 | 2/2012 | El-Siblani et al. | |
| 8,157,908 B2 | 4/2012 | Williams | |
| 8,185,229 B2 | 5/2012 | Davidson | |
| 8,096,262 B2 | 6/2012 | Ederer et al. | |
| 8,211,226 B2 | 7/2012 | Bredt et al. | |
| 8,444,903 B2 | 5/2013 | Lyons et al. | |
| 8,475,946 B1 | 7/2013 | Dion et al. | |
| 8,506,862 B2 | 8/2013 | Giller et al. | |
| 8,506,870 B2 | 8/2013 | Hochsmann et al. | |
| 8,568,649 B1 | 10/2013 | Balistreri et al. | |
| 8,616,872 B2 | 12/2013 | Matsui et al. | |
| 8,623,264 B2 | 1/2014 | Rohner et al. | |
| 8,636,494 B2 | 1/2014 | Gothait et al. | |
| 8,636,496 B2 | 1/2014 | Das et al. | |
| 8,666,142 B2 | 3/2014 | Shkolnik et al. | |
| 8,715,832 B2 | 5/2014 | Ederer et al. | |
| 8,741,194 B1 | 6/2014 | Ederer et al. | |
| 8,741,203 B2 | 6/2014 | Liska et al. | |
| 8,761,918 B2 | 6/2014 | Silverbrook | |
| 8,815,143 B2 | 8/2014 | John et al. | |
| 8,844,133 B2 | 9/2014 | Fuller | |
| 8,845,316 B2 | 9/2014 | Schillen et al. | |
| 8,845,953 B1 | 9/2014 | Balistreri et al. | |
| 8,876,513 B2 | 11/2014 | Lim et al. | |
| 8,915,728 B2 | 12/2014 | Mironets et al. | |
| 8,926,304 B1 | 1/2015 | Chen | |
| 8,932,511 B2 | 1/2015 | Napadensky | |
| 8,968,625 B2 | 3/2015 | Tan | |
| 8,991,211 B1 | 3/2015 | Arlotti et al. | |
| 8,998,601 B2 | 4/2015 | Busato | |
| 9,067,359 B2 | 6/2015 | Rohner et al. | |
| 9,101,321 B1 | 8/2015 | Kiesser | |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,233,504 B2 | 1/2016 | Douglas et al. | |
| 9,248,600 B2 | 2/2016 | Goodman et al. | |
| 9,259,880 B2 | 2/2016 | Chen | |
| 9,327,385 B2 | 5/2016 | Webb et al. | |
| 9,360,757 B2 | 6/2016 | DeSimone et al. | |
| 9,364,848 B2 | 6/2016 | Silverbrook | |
| 9,403,322 B2 | 8/2016 | Das et al. | |
| 9,403,324 B2 | 8/2016 | Ederer et al. | |
| 9,415,544 B2 | 8/2016 | Kerekes et al. | |
| 9,429,104 B2 | 8/2016 | Fuller | |
| 9,434,107 B2 | 9/2016 | Zenere | |
| 9,453,142 B2 | 9/2016 | Rolland et al. | |
| 9,463,488 B2 | 10/2016 | Ederer et al. | |
| 9,469,074 B2 | 10/2016 | Ederer et al. | |
| 9,487,443 B2 | 11/2016 | Watanabe | |
| 9,498,920 B2 | 11/2016 | DeSimone et al. | |
| 9,511,546 B2 | 12/2016 | Chen et al. | |
| 9,517,591 B2 | 12/2016 | Yoo et al. | |
| 9,517,592 B2 | 12/2016 | Yoo et al. | |
| 9,527,244 B2 | 12/2016 | El-Siblani | |
| 9,529,371 B2 | 12/2016 | Nakamura | |
| 9,539,762 B2 | 1/2017 | Durand et al. | |
| 9,545,753 B2 | 1/2017 | Costabeber | |
| 9,561,622 B2 | 2/2017 | Das et al. | |
| 9,578,695 B2 | 2/2017 | Jerby et al. | |
| 9,579,852 B2 | 2/2017 | Okamoto | |
| 9,592,635 B2 | 3/2017 | Ebert et al. | |
| 9,604,411 B2 | 3/2017 | Rogren | |
| 9,632,420 B2 | 4/2017 | Allanic | |
| 9,632,983 B2 | 4/2017 | Ueda et al. | |
| 9,636,873 B2 | 5/2017 | Joyce | |
| 9,649,812 B2 | 5/2017 | Hartmann et al. | |
| 9,649,815 B2 | 5/2017 | Atwood et al. | |
| 9,670,371 B2 | 6/2017 | Pervan et al. | |
| 9,676,143 B2 | 6/2017 | Kashani-Shirazi | |
| 9,676,963 B2 | 6/2017 | Rolland et al. | |

(56) References Cited

U.S. PATENT DOCUMENTS

| | | |
|---|---|---|
| 9,682,166 B2 | 6/2017 | Watanabe |
| 9,682,425 B2 | 6/2017 | Xu et al. |
| 2004/0060683 A1* | 4/2004 | Sercombe .................. B22F 3/26 164/97 |
| 2007/0075460 A1* | 4/2007 | Wahlstrom ............ B29C 64/135 264/401 |
| 2008/0170112 A1 | 7/2008 | Hull et al. |
| 2009/0304952 A1* | 12/2009 | Kritchman ............. B33Y 10/00 427/595 |
| 2010/0003619 A1 | 1/2010 | Das et al. |
| 2012/0195994 A1* | 8/2012 | El-Siblani .............. B33Y 10/00 425/174.4 |
| 2014/0103581 A1 | 4/2014 | Das et al. |
| 2014/0275317 A1 | 9/2014 | Moussa |
| 2015/0102531 A1 | 4/2015 | El-Siblani et al. |
| 2015/0140152 A1 | 5/2015 | Chen |
| 2015/0145174 A1 | 5/2015 | Comb |
| 2015/0224710 A1 | 8/2015 | El-Siblani |
| 2015/0231831 A1* | 8/2015 | El-Siblani ............. B29C 64/241 264/401 |
| 2015/0355553 A1 | 12/2015 | Allanic |
| 2016/0031010 A1 | 2/2016 | O'Neill et al. |
| 2016/0046075 A1 | 2/2016 | DeSimone et al. |
| 2016/0096332 A1 | 4/2016 | Chen et al. |
| 2016/0107387 A1 | 4/2016 | Ooba et al. |
| 2016/0129631 A1 | 5/2016 | Chen et al. |
| 2016/0193785 A1 | 7/2016 | Bell et al. |
| 2016/0221262 A1 | 8/2016 | Das et al. |
| 2016/0332386 A1 | 11/2016 | Kuijpers |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0057177 A1 | 3/2017 | Ferguson et al. |
| 2017/0066196 A1 | 3/2017 | Beard et al. |
| 2017/0100895 A1 | 4/2017 | Chou et al. |
| 2017/0100897 A1 | 4/2017 | Chou et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120536 A1* | 5/2017 | Brunermer ............ B29C 64/153 |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157848 A1* | 6/2017 | Teicher .................. B33Y 50/02 |
| 2017/0173865 A1 | 6/2017 | Dikovsky et al. |
| 2017/0182708 A1* | 6/2017 | Lin ........................ B33Y 10/00 |
| 2017/0190120 A1 | 7/2017 | Bloome et al. |
| 2017/0297108 A1 | 10/2017 | Gibson et al. |
| 2017/0297109 A1 | 10/2017 | Gibson et al. |
| 2018/0200948 A1* | 7/2018 | Kuijpers ............... B29C 64/357 |
| 2019/0016046 A1* | 1/2019 | Liu ..................... G03F 7/70416 |
| 2019/0143601 A1* | 5/2019 | Jung ..................... B33Y 10/00 264/497 |
| 2019/0232560 A1* | 8/2019 | Thompson ............ B29C 64/241 |
| 2020/0282645 A1* | 9/2020 | Vermuelen ............ B29C 64/153 |
| 2021/0291446 A1* | 9/2021 | Coward ................ B29C 64/205 |

FOREIGN PATENT DOCUMENTS

| | | |
|---|---|---|
| WO | 2012/106256 A1 | 8/2012 |
| WO | 2015/107066 A1 | 7/2015 |
| WO | 2016/112084 A1 | 7/2016 |

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachines, Article 11 May 2017, Micromachines, Seoul University, Seoul, Korea.

International Search Report and Written Opinion issued in connection with corresponding PCT Application No. PCT/US18/49028 dated Dec. 19, 2018.

* cited by examiner

PLATE-BASED ADDITIVE MANUFACTURING APPARATUS AND METHOD

BACKGROUND OF THE INVENTION

This invention relates generally to additive manufacturing, and more particularly to methods for curable material handling in additive manufacturing.

Additive manufacturing is a process in which material is built up piece-by-piece, line-by-line, or layer-by-layer to form a component. Stereolithography is a type of additive manufacturing process which employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer or to another build surface.

In curing the photopolymer resin, it is preferable to have a fresh supply of material for each layer. Old resin may contain cured products such as supports that have broken off of the part or other external contamination. In a vat-based process, this contamination or the contaminated material can cure into the component, resulting in undesirable geometry, or otherwise disrupt the build process and damage the final part.

Another prior art method is a so-called "tape casting" process. In this process, a resin is deposited onto a flexible radiotransparent tape that is fed out from a supply reel. An upper plate lowers on to the resin, compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional curing. One problem with tape casting is that it is wasteful because the tape is often not reusable.

BRIEF DESCRIPTION OF THE INVENTION

At least one of these problems is addressed by an additive manufacturing method in which material is deposited and cured on a plate which can be cleaned between layer cycles.

According to one aspect of the technology described herein, an additive manufacturing apparatus for manufacturing a three-dimensional component includes: a build plate, at least a portion of which is transparent, the build plate defining a build surface; a material depositor operable to deposit a radiant-energy-curable resin on the build surface; a stage positioned facing the build surface of the build plate and configured to hold a stacked arrangement of one or more cured layers of the resin; one or more actuators operable to change the relative positions of the build plate and the stage; a radiant energy apparatus positioned adjacent to the build plate opposite to the stage, and operable to generate and project radiant energy on the resin through the build plate in a predetermined pattern; and a cleaning apparatus operable to remove debris from the build surface.

According to another aspect of the technology described herein, a method for producing a component layer-by-layer includes the steps of: depositing a radiant-energy-curable resin on a build surface of a build plate which includes at least a portion which is transparent; defining a layer increment in the resin; selectively curing the resin while the build plate is positioned in a build zone defined between the stage and a radiant energy apparatus, using an application of radiant energy, from the radiant energy apparatus, in a specific pattern so as to define the geometry of a cross-sectional layer of the component; moving the build plate and the stage relatively apart so as to separate the component from the build surface; using a cleaning apparatus to remove material that remains on the build surface; and repeating the steps of depositing, defining, curing, moving, and cleaning for a plurality of layers until the component is complete.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
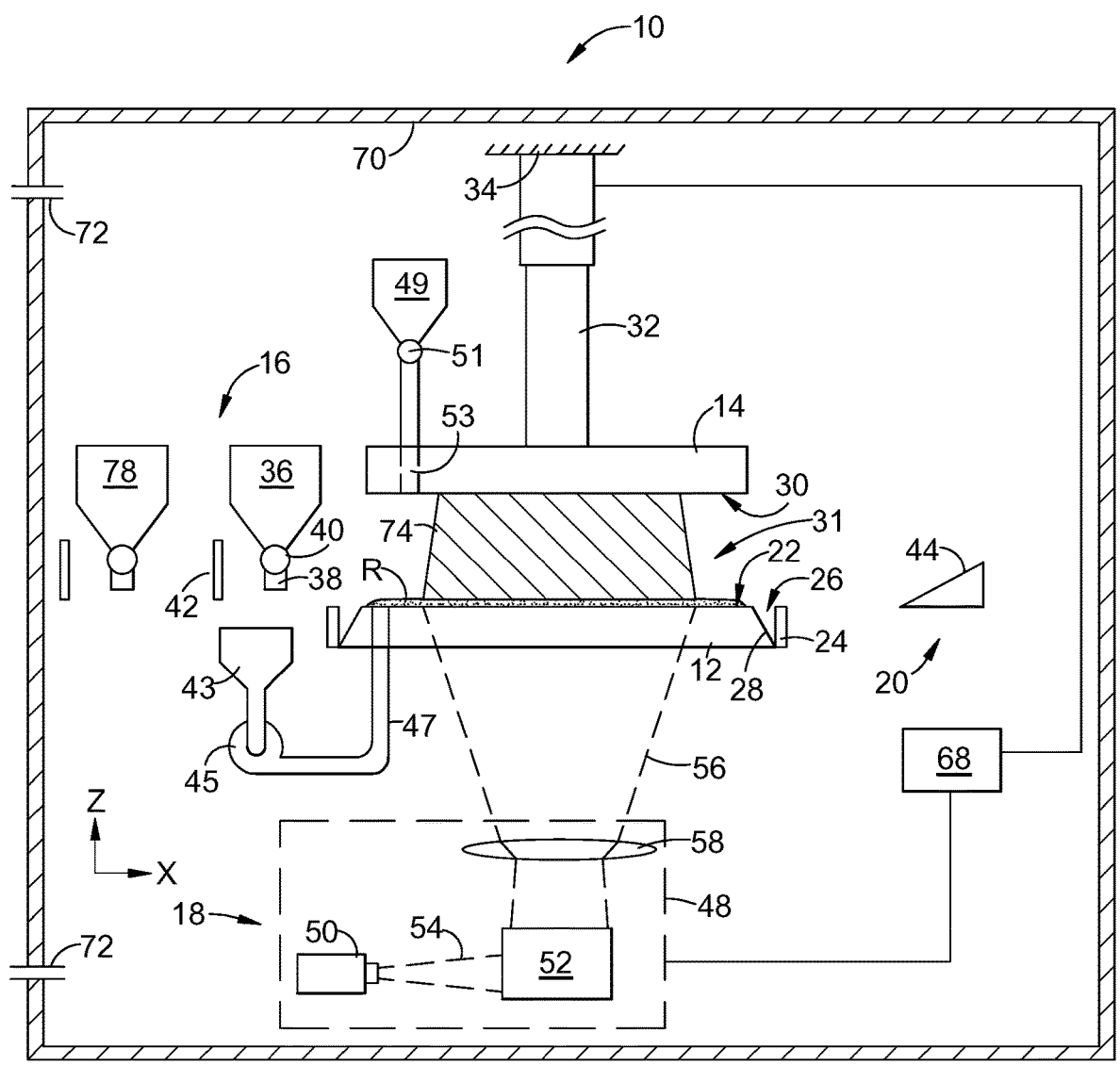
FIG. 1 is a schematic side elevation view of an exemplary additive manufacturing apparatus.

Referring to the drawings wherein identical reference numerals denote the same elements throughout the various views, FIG. 1 illustrates schematically an example of one type of suitable apparatus 10 for carrying out an additive manufacturing method as described herein. As will be explained in more detail below, it will be understood that other configurations of equipment may be used to carry out the method described herein. Basic components of the exemplary apparatus 10 include a build plate 12, a stage 14, a material depositor 16, a radiant energy apparatus 18, and a cleaning apparatus 20. Each of these components will be described in more detail below.

The build plate 12 defines a planar build surface 22. For purposes of convenient description, the build surface 22 may be considered to be oriented parallel to an X-Y plane of the apparatus 10, and a direction perpendicular to the X-Y plane is denoted as a Z-direction (X, Y, and Z being three mutually perpendicular directions).

The build plate 12 is sufficiently stiff such that, under the expected loads applied during an additive manufacturing process, it does not bend or deflect enough to interfere with the additive manufacturing process, or cause an unacceptable amount of distortion or inaccuracy in the component being produced. The desired stiffness may be provided through a combination of material properties (i.e. a sufficiently high modulus) and/or component design (i.e. thickness, stiffening features, etc.).

The build plate 12, or selected portions of it, are transparent. As used herein, "transparent" refers to a material which allows radiant energy of a selected wavelength to pass through. For example, as described below, the radiant energy used for curing could be ultraviolet light or laser light in the visible spectrum. Nonlimiting examples of transparent materials include polymers, glass, and crystalline minerals such as sapphire or quartz. The build plate 12 could be made up of two or more subcomponents, some of which are transparent.

The build surface 22 may be configured to be "non-stick", that is, resistant to adhesion of cured resin. The non-stick properties may be embodied by a combination of variables such as the chemistry of the build plate 12, its surface finish, and/or applied coatings. In one example, a permanent or semi-permanent non-stick coating may be applied. One nonlimiting example of a suitable coating is polytetrafluoroethylene ("PTFE"). In one example, all or a portion of the build surface 22 may incorporate a controlled roughness or surface texture (e.g. protrusions, dimples, grooves, ridges, etc.) with nonstick properties. In one example, the build table 12 may be made from an oxygen-permeable material.

Optionally, the build plate 12 may be surrounded by a structure which serves as a catchment or retainer for used material. In the illustrated example, a peripheral wall 24 extends around the build plate 12 and defines a catch trough 26 in cooperation with lateral surfaces 28 of the build plate 12.

The stage 14 is a structure defining a planar upper surface 30 which is capable of being oriented parallel to the build surface 22 during the layer orientation and curing steps described below. Collectively, the build plate 12 and the radiant energy apparatus 18 define a "build zone" 31.

Some means are provided for or moving the build plate 12 relative to the stage 14 parallel to the Z-direction. In FIG. 1, these means are depicted schematically as a simple actuator 32 connected between the stage 14 and a stationary support structure 34, with the understanding devices such as pneumatic cylinders, hydraulic cylinders, ballscrew electric actuators, linear electric actuators, or delta drives may be used for this purpose. In addition to or as an alternative to making the stage 14 movable, the build plate 12 could be movable parallel to the Z-direction.

The material depositor 16 may be any device or combination of devices which is operable to apply a layer of resin R over the build plate 12. The material depositor 16 may optionally include a device or combination of devices to define a height in the resin and/or to level the resin R. Nonlimiting examples of suitable material deposition devices include chutes, hoppers, pumps, spray nozzles, spray bars, or printheads (e.g. inkjets).

In the example shown in FIG. 1, the material depositor 16 comprises a supply container 36 with a nozzle 38 and a valve 40. Means may be provided for mixing the resin R to ensure the material is homogenous (including for example, any or all of: new resin R, used resin R, new filler, used filler). Appropriate means are provided for moving the material depositor 16 over the build surface 22, such as the actuator 41 seen in FIG. 6, to deposit resin R. Generally, the resin would also include a filler as described below. Optionally the resin R could be used without a filler, provided the resin has a high enough viscosity so that it will not run off the build surface 22. Means may be provided for leveling the applied resin R. In the illustrated example, In the example shown in FIG. 1, the material depositor 16 includes a recoater 42 which is laterally-elongated structure. This may be rigidly fixed to the supply container 36 or may be connected to a separate actuator (not shown).

Other types of material depositors may be used; for example, one or more rollers (not shown) may be provided to move and level the resin R. Optionally, the resin R may be leveled by vibrating the build plate 12. Another option for depositing resin R would be to use a material depositor incorporated with the build plate 12. For example, FIG. 1 illustrates a supply container 43 which communicates with a pump 45 and a discharge pipe 47 which extends through an opening in the build plate 12. This or similar apparatus could be used to pump resin R to the build surface 22. The resin R could then be leveled using the recoater 42 or another similar mechanism. Another option for depositing resin R would be to use a material depositor incorporated with the stage 14. For example, FIG. 1 illustrates a supply container 49 which communicates with a valve 51 and a discharge pipe 53 which extends through an opening in the stage 14. This or similar apparatus could be used to discharge resin R between the build plate 12 and the stage 14.

Figure 10:
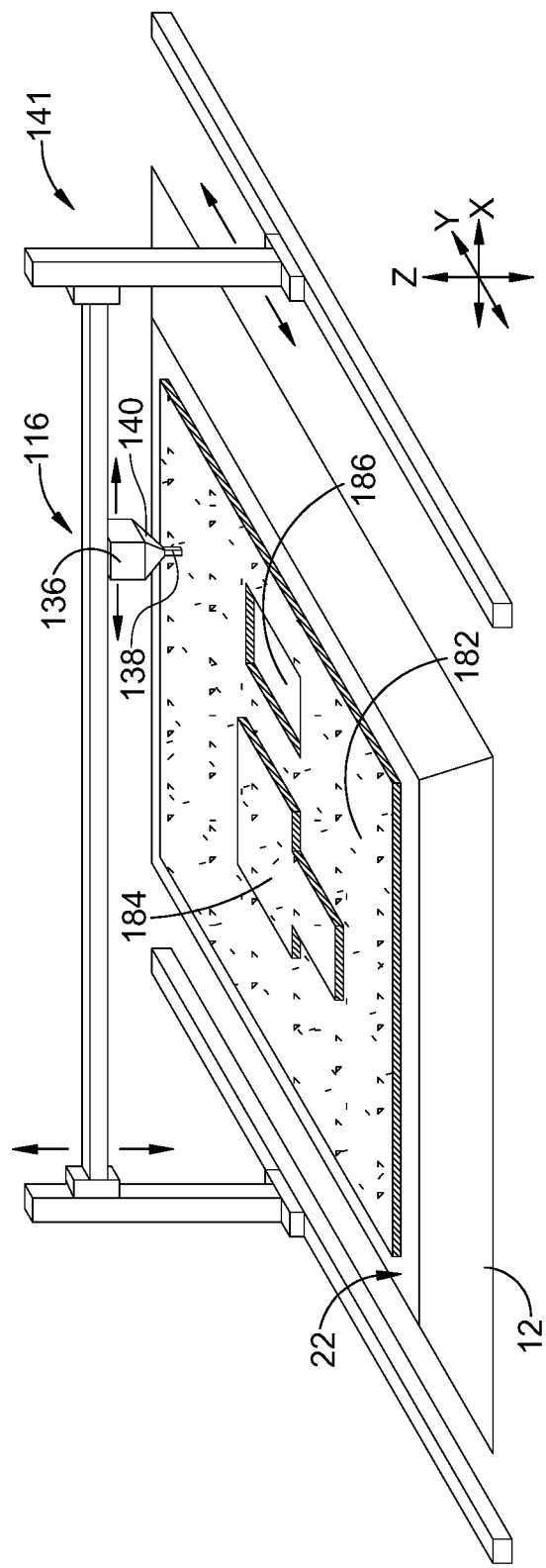
FIG. 10 is a schematic perspective view of a build plate having a layer of resin applied thereto.

FIG. 10 illustrates an example of yet another suitable type of material depositor 116 comprising a supply container 136 with a nozzle 138 and a flow control mechanism 140. Appropriate means are provided for controlled 3D movement of the material depositor 116 over the build surface 22 (e.g. in X, Y, Z axes). FIG. 10 shows an actuator assembly 141 as an example. As explained in more detail below, this type of material depositor 116 is capable of depositing resin R in layers having arbitrary shapes and variable thickness.

The cleaning apparatus 20 may be any device or combination of devices which is effective to remove uncured resin R and other debris from the build surface 22. Nonlimiting examples of suitable cleaning devices include scrapers, brushes, suction or blowing mechanisms, absorbent or sponge-like devices, solvent rinsing equipment, or combinations thereof.

In the example shown in FIG. 1, the cleaning apparatus 20 includes a scraper 44 which is a laterally-elongated structure. It is connected to an actuator 46 (shown schematically in FIG. 6) operable to selectively move the scraper 44 laterally over the build surface 22.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Nonlimiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 10 may be a digital micromirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other parts of the projector 48, with the effect of rastering or shifting the location of the patterned image 64 on the build surface 22. Stated another way, the patterned image may be moved away from a nominal or starting location. This permits a single image forming apparatus 52 to cover a larger build area, for example. Means for rastering or shifting the patterned image from the image forming apparatus 52 are commercially available. This type of image projection may be referred to herein as a "tiled image".

Figure 2:
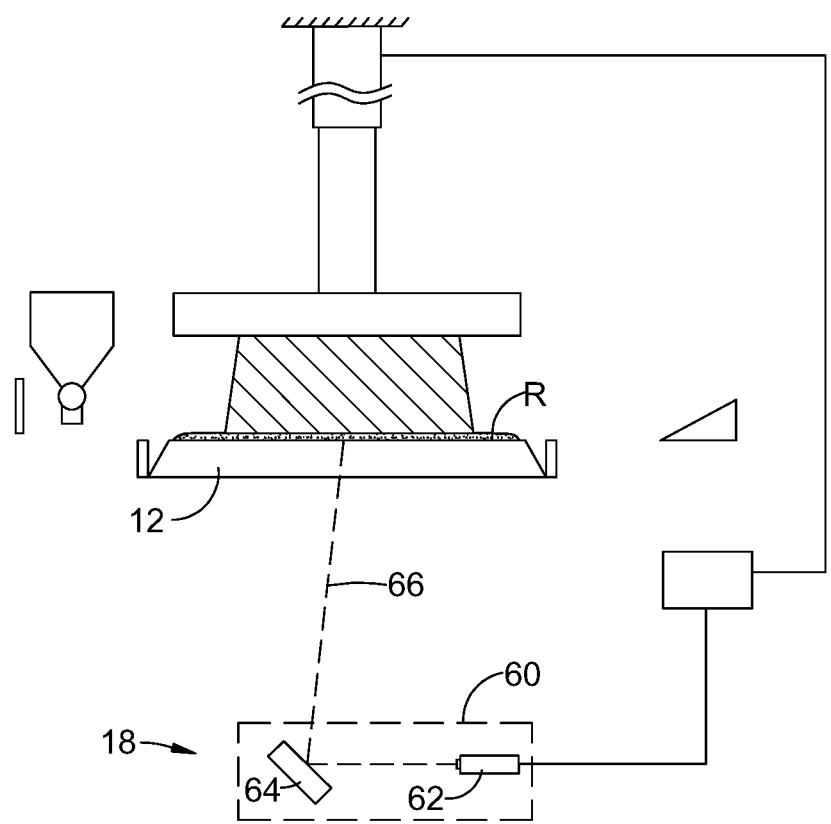
FIG. 2 is a schematic side elevation view of an alternative additive manufacturing apparatus.

In another exemplary embodiment as shown in FIG. 2, the radiant energy apparatus 18 may comprise a "scanned beam apparatus" 60 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Nonlimiting examples of suitable radiant energy sources include lasers or electron beam guns.

The beam steering apparatus 10 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, including some or all of the material depositor 16, the stage 14, the radiant energy apparatus 18, the cleaning apparatus 20, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the enclosure could be maintained at a desired level greater than or less than atmospheric. Optionally, the enclosure 70 could be temperature and/or humidity controlled. Optionally, ventilation of the enclosure 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

Generally, the resin R should be flowable so that it can be leveled between the build plate 12 and the build surface 22. A suitable resin R will be a material that is relatively thick, i.e. its viscosity should be sufficient that it will not run off of the build plate 12 during the curing process. The composition of the resin R may be selected as desired to suit a particular application. Mixtures of different compositions may be used.

The resin R may be selected to have the ability to out-gas or burn off during further processing, such as the sintering process described above.

The filler may be pre-mixed with resin R, then loaded into the material depositor 16. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon via application of sufficient energy. For example, fusibility is a characteristic of many available polymeric, ceramic, glass, and metallic powders.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIGS. 3-7. It will be understood that, as a precursor to producing a component and using the apparatus 10, the component 74 is software modeled as a stack of planar layers arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

Figure 3:
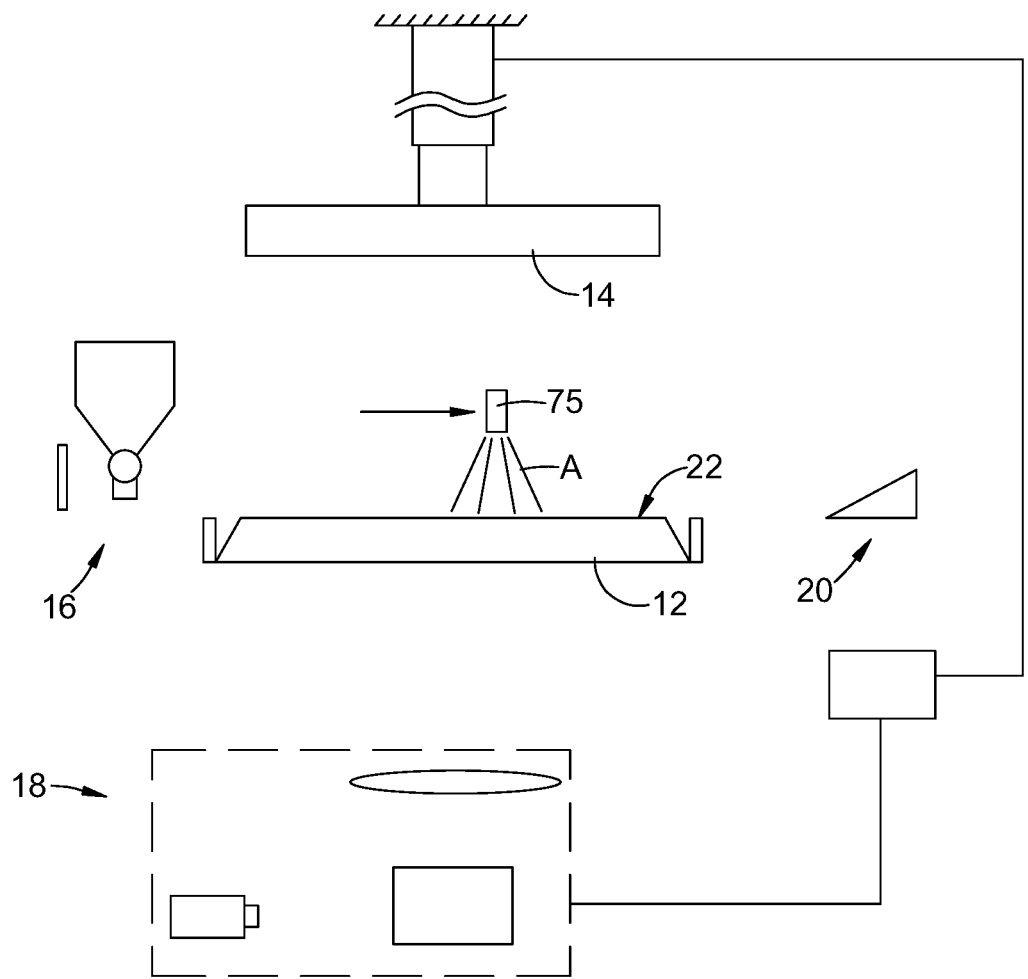
FIG. 3 is a side view of the apparatus of FIG. 1, showing an optional release agent spray head.
Figure 4:
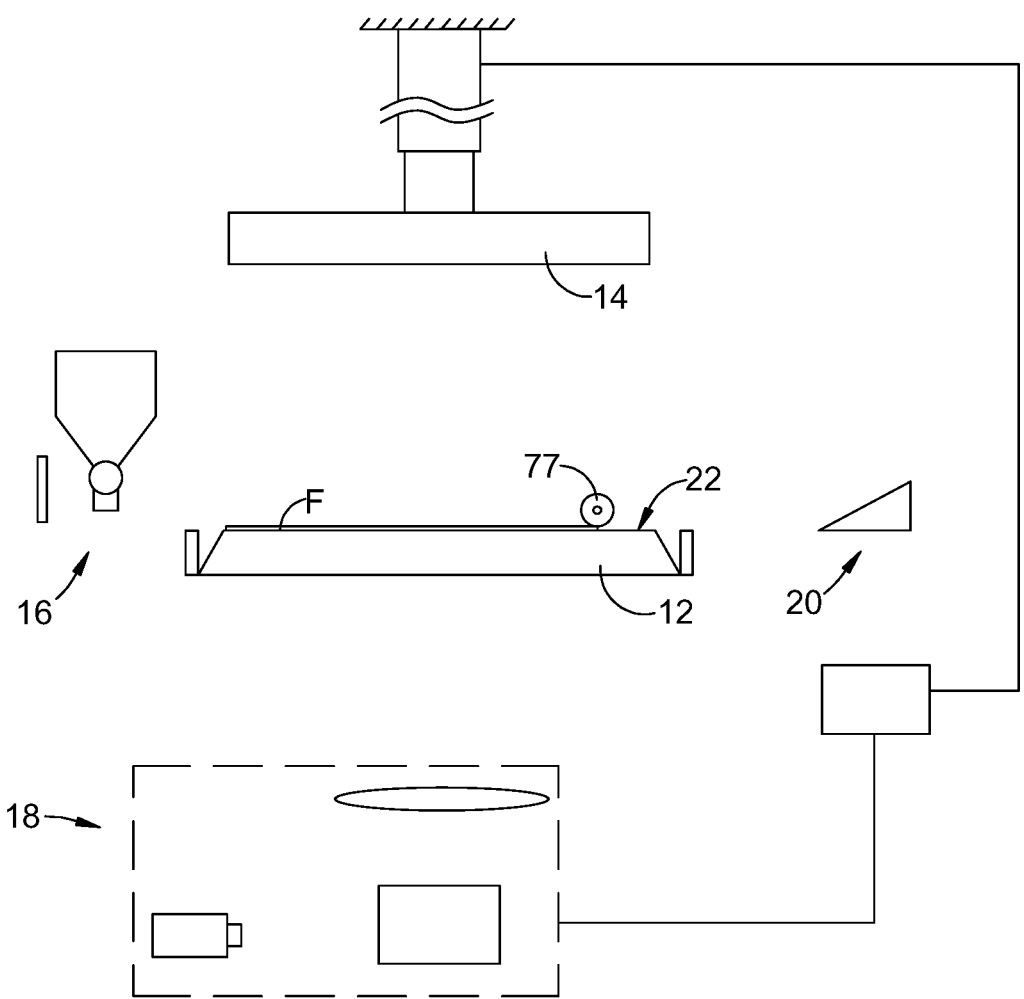
FIG. 4 is a side view of the apparatus of FIG. 1, showing an optional release film applicator.
Figure 5:
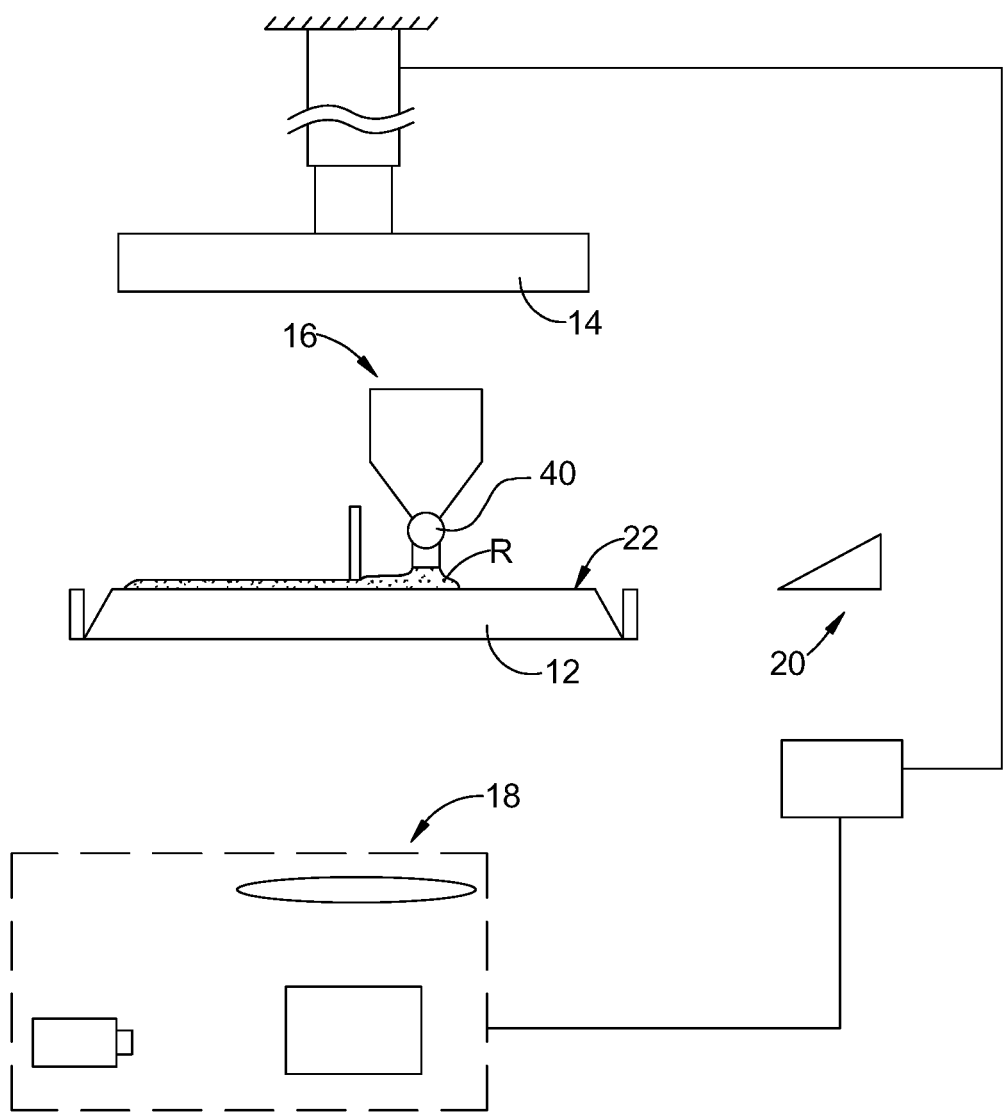
FIG. 5 is a view of the apparatus of FIG. 1, showing resin being deposited onto a build plate thereof.

Optionally, the build process may begin by applying a nonstick material to the build surface 22 prior to resin application. For example, a release agent such as polyvinyl alcohol ("PVA") may be applied to the build surface 22 prior to each layer being built. FIG. 3 shows a release agent "A" being applied to the build surface 22 by a moving spray nozzle 75. In another example, a sacrificial layer having non-stick properties may be applied. FIG. 4 shows a non-stick film "F" (e.g. polymer sheet or film) being laid down on the build surface 22 by moving roller 77. The film F may be removed after a layer is cured as described below. Optionally, to prevent sticking, some means could be provided to supply oxygen through the thickness of the build plate 12, in order to inhibit curing of the resin R immediately adjacent the build surface 22 (oxygen can inhibit the curing of UV-curable resins).

The material depositor 16 is used to apply resin R to the build surface 22. In the example shown in FIG. 5, the valve 40 is open and resin flows over the build plate 12 as the material depositor 16 translates laterally above the build plate 12, and the recoater 42 levels the resin R.

Optionally, different layers may comprise two or more different material combinations of resin R and/or filler. As used herein, the term "material combination" refers to any difference in either of the constituents. So, for example, a particular resin composition mixed with either of two different filler compositions would represent two different material combinations. For example, one layer may comprise a first combination of resin R and filler, and a second layer may comprise a different combination of resin R and filler. Stated another way, any desired resin and any desired filler can be used for any given layer. The different materials may be provided, for example, by providing one or more additional supply containers 78, as seen in FIG. 1.

Figure 6:
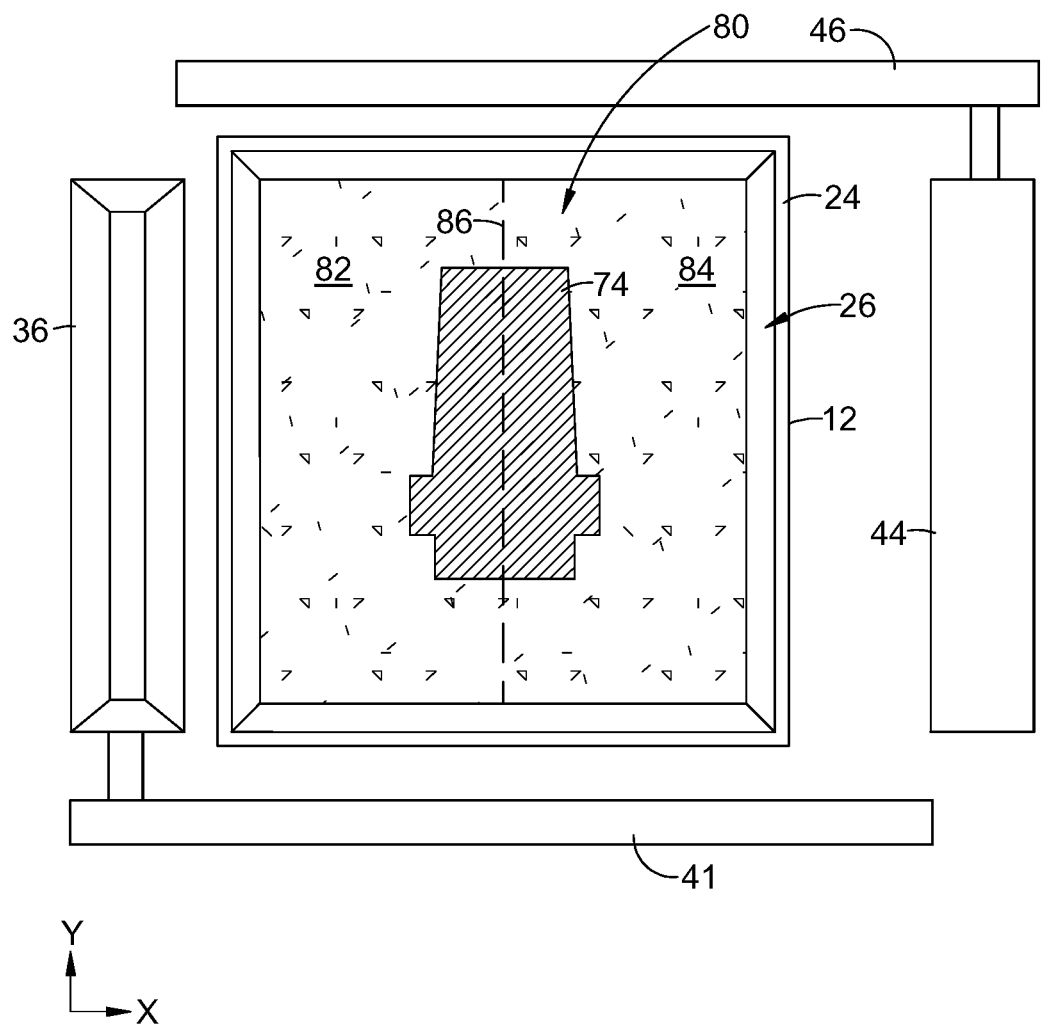
FIG. 6 is a schematic top plan view of a layer of resin having multiple sections being applied in the apparatus of FIG. 1.
Figure 7:
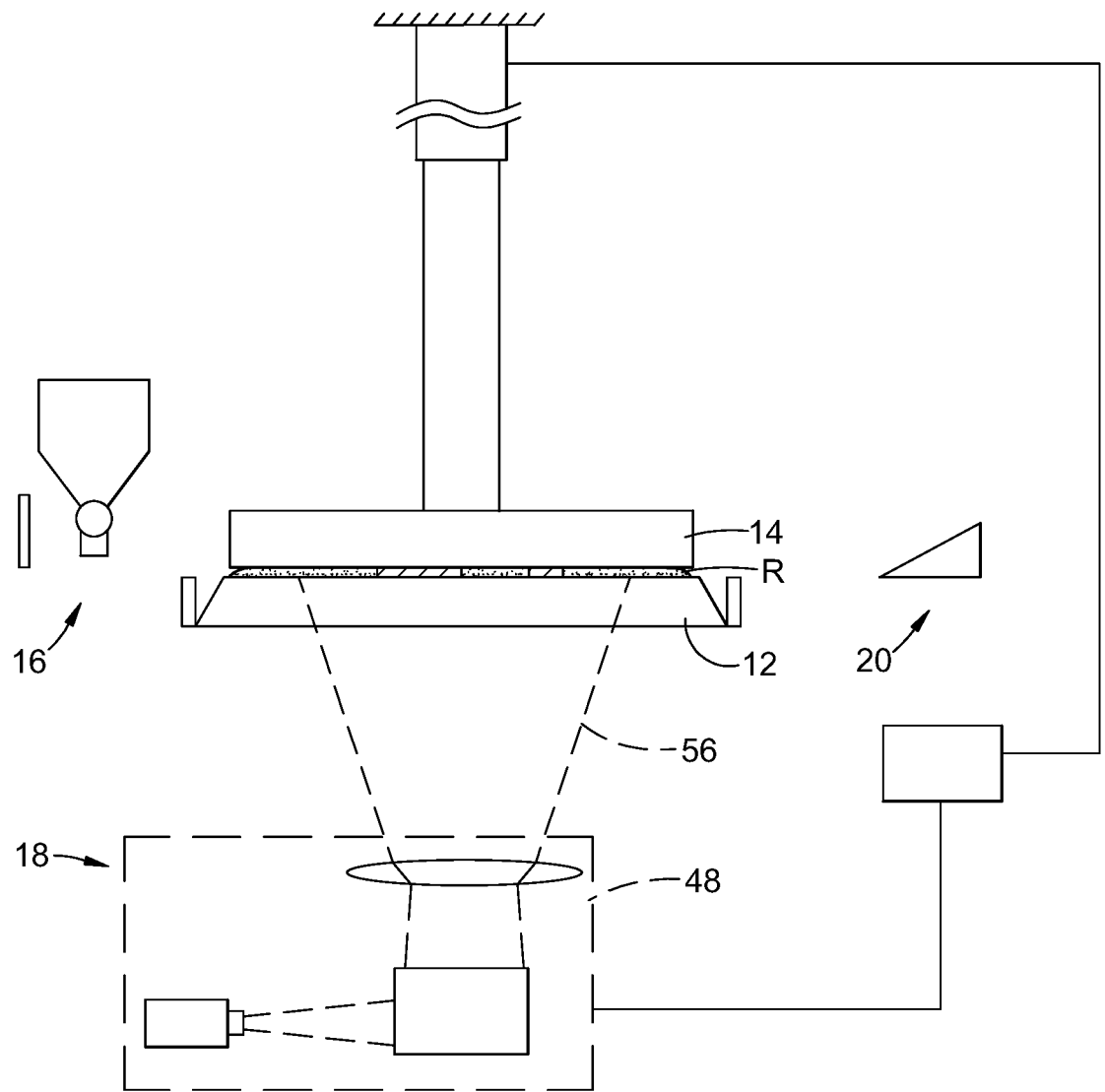
FIG. 7 is a view of the apparatus of FIG. 1, showing a stage lowered into place and resin being cured using a radiant energy apparatus.

Optionally, any of the individual layers may comprise two or more material combinations. FIG. 6 illustrates an exemplary layer 80 showing a cross-section of the component 74 superimposed thereupon. The layer 80 is divided into a first section 82 including a first combination of resin R and filler, and a second section 84 including a second combination of resin R and filler. A dashed line 86 indicates the division between the two sections 82, 84. The shape, size, and number of sections, and number of different material combinations within a given layer may be arbitrarily selected. If multiple material combinations are used in one layer, then the deposition steps described above would be carried out for each section of the layer.

Optionally, the layer may have a variable thickness. For example, FIG. 10 illustrates an exemplary layer 180 having some areas (exemplified by section 182) a relatively smaller thickness and other areas (exemplified by section 184) having relatively larger thickness. The layer 180 may also include areas devoid of material (exemplified by open area 186). The shape of the various sections of layer may be arbitrary, as exemplified by the raised section 184. This type of variable-thickness layer may be applied, for example using the material depositor 116 described above.

After the material is deposited, or as an integral part of the deposition staff, the apparatus 10 is positioned to define a selected layer increment. The layer increment is defined by some combination of the thickness that the resin R is applied by the material depositor 16 or 116 (including optionally the operation of the recoater 42), or the operation of the stage 14, or some combination thereof. For example, the stage 14 could be positioned such that the upper surface 30 is just touching the applied resin R, or the stage 14 could be used to compress and displace the resin R to positively define the layer increment. See FIG. 7. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

Once the resin R with filler has been applied and the layer increment defined, the radiant energy apparatus 18 is used to cure a cross-section or layer of the component 74 being built.

Where a projector 48 is used, the projector 48 projects a patterned image 56 representative of a cross-section of the component 74 through the build plate 12 to the resin R. Exposure to the radiant energy cures and solidifies the pattern in the resin R. This type of curing is referred to herein as "selective" curing. It will be understood that photopolymers undergo degrees of curing. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Figure 8:
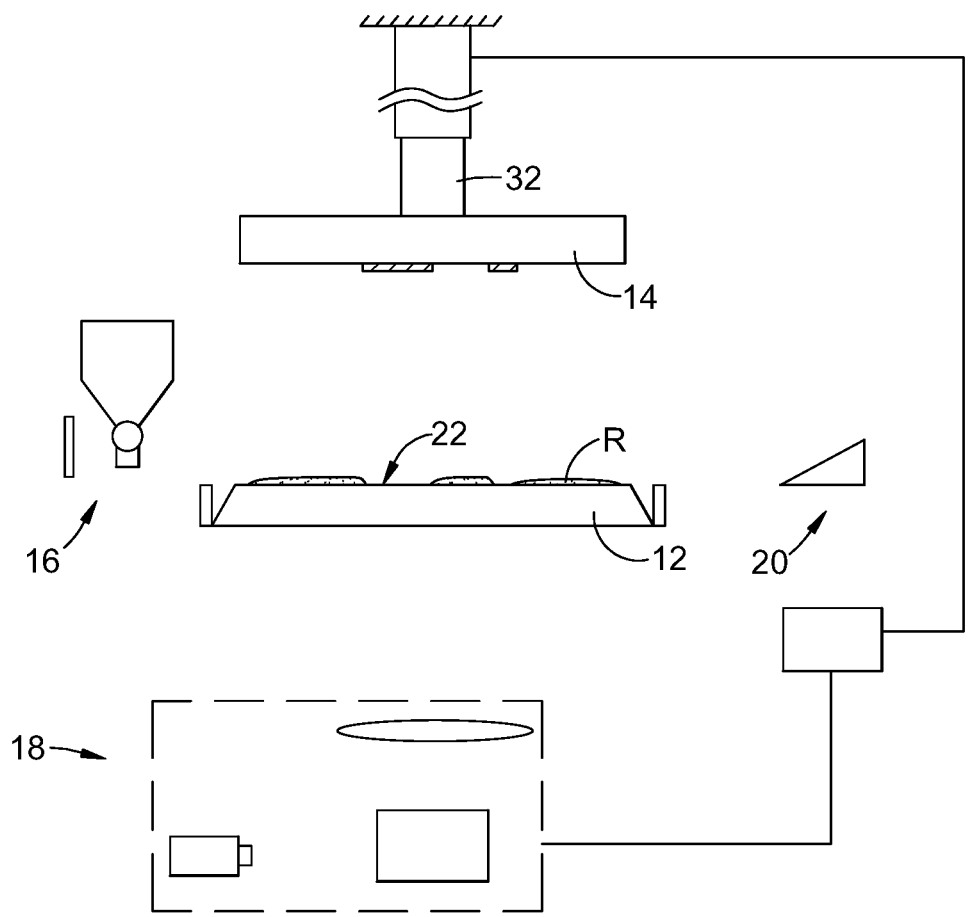
FIG. 8 is a view of the apparatus of FIG. 1, showing a stage retracted.

Once curing of the first layer is complete, the stage 14 is separated from the build plate 12, for example by raising the stage 14 using the actuator 32 (FIG. 8). It is noted that stage 14 and the build plate 12 do not necessarily have to remain parallel during the separation procedure. For example, the build plate 12 could rotate (e.g. using of a pinned joint or a flexure) or through small-scale deformations of the build plate 12. This flexing or rotation could be helpful in separating cured resin from the build plate 12.

Figure 9:
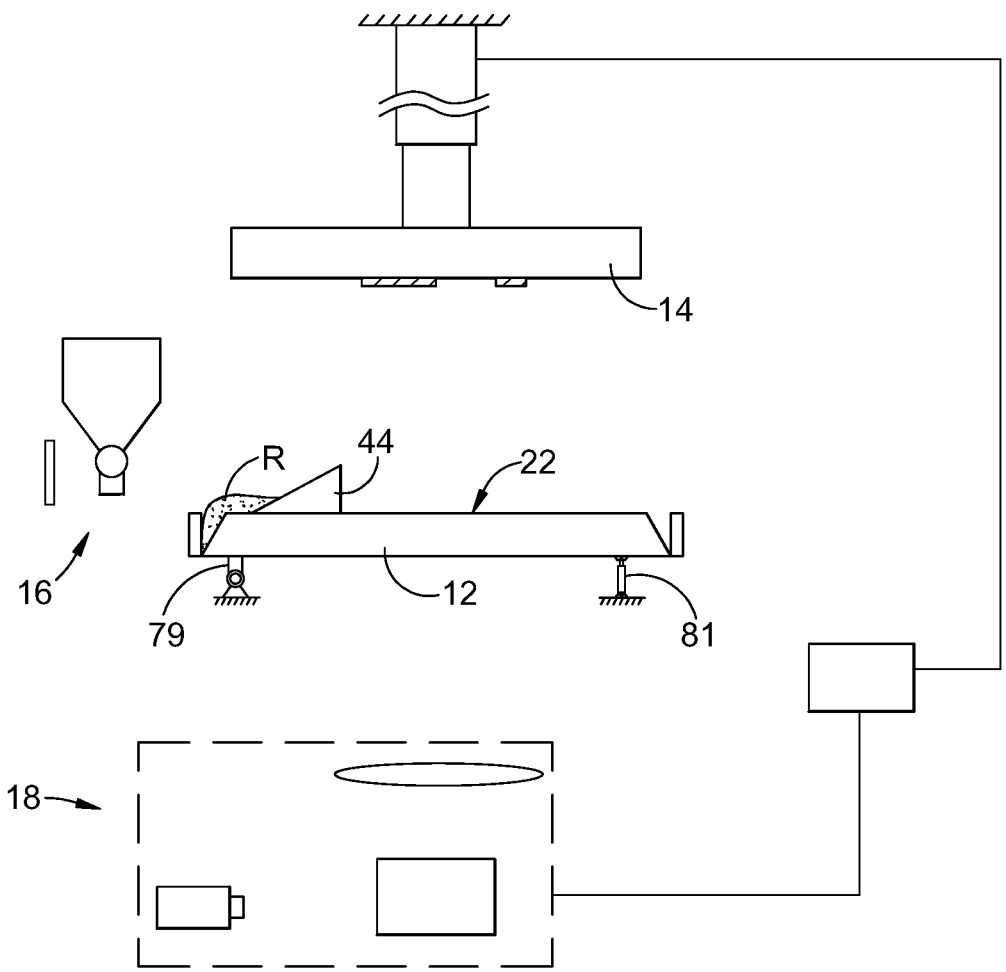
FIG. 9 is a view of the apparatus of FIG. 1, showing a cleaning apparatus removing excess uncured resin from the build plate.

The build surface 22 is then cleaned to remove any excess cured or uncured resin R, filler, release agent, nonstick film F, or other debris. For example, this may be done by moving the scraper 44 described above across the build surface 22, as shown in FIG. 9. Optionally, the build plate 12 may be articulated in some way to aid the cleaning process by encouraging debris to slide off. For example, the build plate may be mounted to a pivot 79 and coupled to a tilt actuator 81. The build plate 12 need not remain in the build position in during the cleaning process. For example, in a variation, the build plate 12 may be moved out of the build zone 31 for resin application, moved into the build zone for curing, and then moved out of the build zone 31 for cleaning and resin re-application in subsequent steps. A conventional device such as a manipulator arm or conveyor belt (not shown) could be used to move the build plate for this purpose. It will be understood that in this variation the material depositor 16 and the cleaning apparatus 20 would be positioned outside of the build zone 31. Conventional alignment means (pins, guides, etc.—not shown) may be provided to ensure repeatable positioning of the build plate 12 within the build zone and/or in a loading or cleaning area outside of the build zone.

Figure 11:
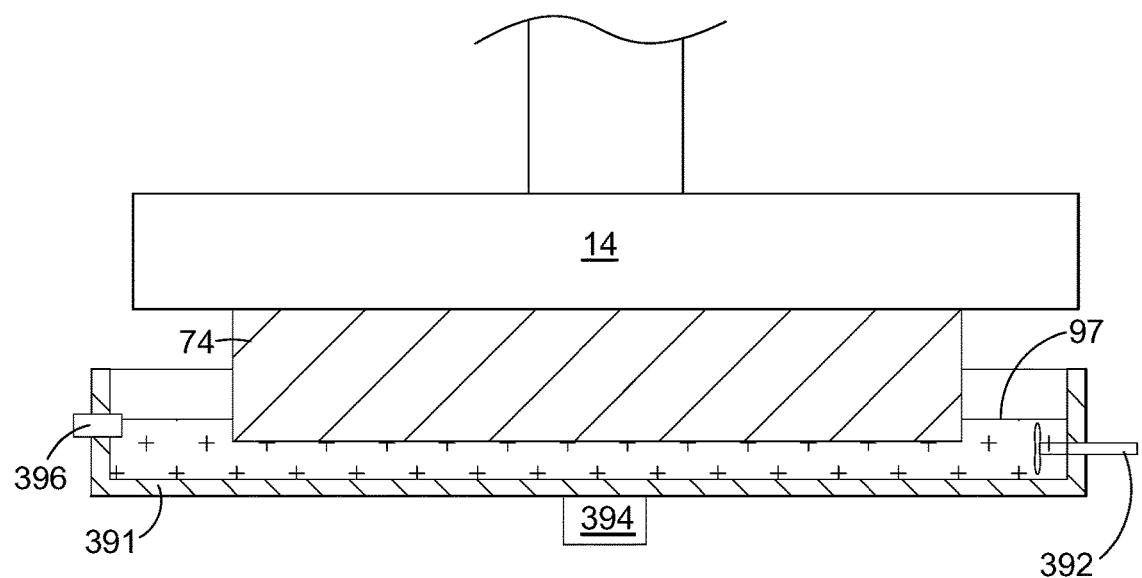
FIG. 11 is a schematic side elevation view of a stage and a vat containing cleaning fluid.
Figure 12:
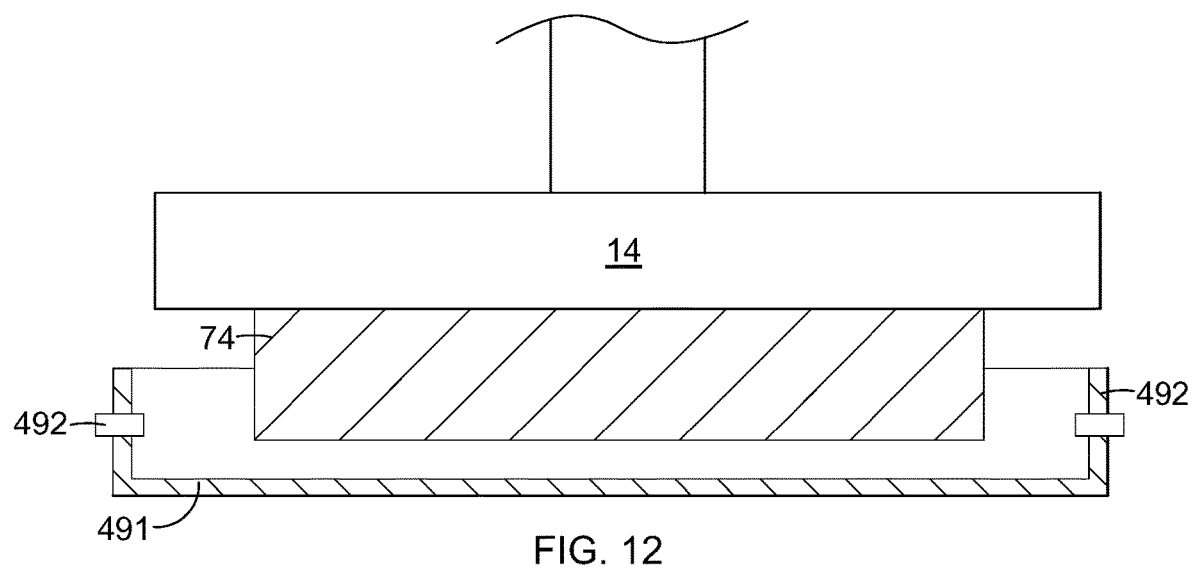
FIG. 12 is a schematic side elevation view of a stage in an empty vat equipped with air nozzles.

Optionally, the component 74 and/or the stage 14 may be cleaned to remove uncured resin R, debris, or contaminants between curing cycles. The cleaning process may be used for the purpose of removing resin R that did not cure or resin R that did not cure enough to gel during the selective curing step described above. For example, it might be desired to clean the component 74 and/or the stage 14 to ensure that no additional material or material contamination is present in the final component 74. For example, cleaning could be done by contacting the component 74 and/or the stage 14 with a cleaning fluid such as a liquid detergent or solvent. FIG. 11 shows one example of how this could be accomplished by providing a cleaning vat 391 containing the cleaning fluid. The cleaning vat 391 comprises a floor surrounded by a peripheral wall. In use, the cleaning fluid 97 would be placed in the cleaning vat 391. A suitable mechanism (not shown) would be used to move the cleaning vat 391 into position under the stage 14. The stage 14 would then be lowered to bring the component 74 into contact with the cleaning fluid 97. Upon completion of the cleaning cycle, the stage 14 would then be raised to move the component 74 clear of the cleaning vat 391. FIG. 11 illustrates several different possible means for producing this relative motion. As one example, a mechanical mixing blade 392 may be used to agitate the cleaning fluid 97. As another example, an ultrasonic transducer 394 coupled to the cleaning vat 391 may be used to produce ultrasonic waves in the cleaning fluid 97. As another example, one or more nozzles 396 may be used to introduce jets of flowing cleaning fluid 97. As yet another example, appropriate actuators (not shown) may be used to produce relative motion of the stage 14 and the cleaning vat 391. Optionally, the cleaning process may include a "drying" step in which the freshly cleaned component 74 is positioned within an empty cleaning vat 491 (FIG. 12) with air nozzles 492 which would be used to direct jets of air at the component 74 for the purpose of blowing off or evaporating the cleaning fluid. Depending on the particular circumstances, the "drying" step may be sufficient to clean the component 74 in and of itself. Subsequent to the cleaning step, the cleaning vat would be moved away from the stage 14.

Once the build surface 22 is clean, resin R with filler is again applied, and another layer increment is defined. The projector 48 again projects a patterned image 56. Exposure to the radiant energy selectively cures resin R as described above, and joins the new layer to the previously-cured layer above. This cycle of applying resin R, incrementing a layer, and then selectively curing is repeated until the entire component 74 is complete.

Where a scanned beam apparatus is used instead of a projector, the radiant energy source 68 emits a beam 66 and the beam steering apparatus 70 is used to cure the resin R by steering a focal spot of the build beam 66 over the exposed resin R in an appropriate pattern. The cycle of cleaning, applying resin R, and defining a layer increment is repeated. The radiant energy source 68 again emits a build beam 66 and the beam steering apparatus 70 is used to steer the focal spot of the build beam 66 over the exposed resin R in an appropriate pattern. The exposed layer of the resin R is exposed to the radiant energy which selectively cures resin R as described above, and joins it to the previously-cured layer above. This cycle of incrementing a layer, applying resin R, and then selectively curing is repeated until the entire workpiece 74 is complete.

Optionally, a scanned beam apparatus may be used in combination with a projector. For example, a scanned beam apparatus may be used to apply radiant energy (in addition to that applied by the projector) by scanning one or multiple beams over the surface of the exposed particulate material P. This may be concurrent or sequential with the use of the projector.

The accuracy of either process, defined as the smallest component feature size which can be produced, is limited mainly by the particle size of the filler and the resolution of the projector 48 or scanned beam apparatus 60.

Any of the curing methods described above results in a component 74 in which the filler (if used) is held in a solid shape by the cured resin R. This component may be usable as an end product for some conditions. Subsequent to the curing step, the component 74 may be removed from the stage 14.

If the end product is intended to be composed of the filler (e.g. to be purely ceramic, glass, metallic, diamond, silicon, graphite, etc., the component 74 may be treated to a conventional sintering process to burn out the resin R and to consolidate the remaining particles. Optionally, a known infiltration process may be carried out during or after the sintering process, in order to fill voids in the component with a material having a lower melting temperature than the filler. The infiltration process improves component physical properties.

The method described herein has several advantages over the prior art. In particular, it eliminates a major pathway for build failures in vat-based photopolymerization. It also potentially has lower cost, less material waste, and higher process speed compared to prior art tape casting methods.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for producing a component layer-by-layer, comprising the steps of:
   depositing a radiant-energy-curable resin on a build surface oriented parallel to a plane extending in an x-direction and a y-direction of a build plate with the build surface being positioned vertically above one or more lateral surfaces that bound the build surface, the build surface further including at least a portion that is transparent through a material depositor that translates laterally above the build plate from an initial position on a first lateral side of the build plate along a first axis parallel to the build plate in the x-direction at a first distance above the build plate in a z-direction;

leveling the resin;

selectively curing the resin while the build plate is positioned in a build zone defined between a stage and a radiant energy apparatus, using an application of radiant energy, from the radiant energy apparatus, in a specific pattern to define a geometry of a cross-sectional layer of the component;

moving the stage relatively apart from the build plate in the z-direction to separate the component from the build surface;

translating a scraper laterally along a second axis parallel to the build plate in the x-direction and at a second distance above the build plate in the z-direction to remove resin that remains on the build surface from an initial position on a second lateral side of the build plate while the build plate remains generally stationary within the build zone, the second lateral side on an opposing side of the build plate from the first lateral side, wherein the second distance is less than the first distance during each of the depositing, defining, curing, moving, and cleaning steps; and repeating the steps of depositing, defining, curing, moving, and cleaning for a plurality of layers until the component is complete.

2. The method of claim 1, wherein the resin is deposited such that the resin in at least one of the layers has a different composition than the resin in another one of the layers.

3. The method of claim 1, wherein at least one of the layers is divided into two or more sections, and the resin is applied such that the resin in at least one of the sections has a different composition than the resin in another one of the sections.

4. The method of claim 1, wherein the application of radiant energy is applied by projecting a patterned image comprising a plurality of pixels.

5. The method of claim 4, wherein the patterned image is shifted during the application of radiant energy.

6. The method of claim 4, wherein additional radiant energy is applied by scanning at least one build beam over the surface of the resin.

7. The method of claim 1, wherein the radiant energy is applied by scanning at least one build beam over the surface of the resin.

8. The method of claim 1, wherein a non-stick coating is applied to the build surface prior to the step of depositing the resin on the build surface.

9. The method of claim 1, wherein a non-stick film is applied to the build surface before the step of curing and is removed after the curing step is completed.

10. The method of claim 1, further comprising sintering the component to burn out the cured resin and consolidate the filler.

11. A method for producing a component layer-by-layer, comprising the steps of:

depositing a radiant-energy-curable resin on a build plate oriented parallel to a plane extending in an x-direction and a y-direction from a material depositor by translating the material depositor over the build plate through actuation of a first actuator positioned on a first side of the build plate in the y-direction, wherein the build plate includes at least a portion which is transparent, and wherein the build plate is positioned vertically above one or more lateral surfaces that bound the build surface;

leveling the resin;

selectively curing the resin while the build plate is positioned in a build zone defined between a stage above the build plate and a radiant energy apparatus below the build plate, using an application of radiant energy, from the radiant energy apparatus, in a specific pattern to define a geometry of a cross-sectional layer of the component;

moving the stage relatively apart from the build plate in a z-direction to separate the component from the build plate;

translating a cleaning apparatus over the build plate through actuation of a second actuator positioned on a second side of the build plate in the y-direction to remove the resin that remains on the build plate, wherein the second side of the build plate is opposite the first side in the y-direction, and wherein each of the first and second actuators extends beyond each of first and second opposing peripheral walls of the build plate in the x-direction; and repeating the steps of depositing, defining, curing, moving, and cleaning for a plurality of layers until the component is complete.

12. The method of claim 11, further comprising:

applying a nonstick film to the build plate prior to depositing the radiant-energy-curable resin on the build plate.

13. The method of claim 12, wherein the resin that remains on the build plate includes any excess cured or uncured resin R and the nonstick film.

14. The method of claim 11, wherein using the cleaning apparatus to remove the resin that remains on the build plate further comprises articulating the build plate with actuation of a tilt actuator to encourage debris to slide off the build plate.

15. A method for producing a component layer-by-layer, comprising the steps of:

activating a pump to pump a radiant-energy-curable resin onto a build plate from a supply container, the build plate including a transparent portion positioned above one or more lateral surfaces of the build plate that bound the transparent portion;

leveling the resin;

selectively curing the resin while the build plate is positioned in a build zone defined between a stage above the build plate and a radiant energy apparatus below the build plate, using an application of radiant energy, from the radiant energy apparatus, in a specific pattern to define a geometry of a cross-sectional layer of the component;

moving the build plate and the stage relatively apart to separate the component from the build plate;

collecting excess resin in a trough positioned along at least first and second opposing lateral sides of the build plate by translating a cleaning apparatus within the build zone and over the trough, wherein the trough is defined between a lateral surface of the build plate and a peripheral wall of the build plate; and repeating the steps of depositing, defining, curing, moving, and cleaning for a plurality of layers until the component is complete.

16. The method of claim 15, wherein the build plate is supported by a pivot and a tilt actuator, and wherein collecting excess resin further comprises articulating the build plate with actuation of the tilt actuator to encourage debris to slide off the build plate.

17. The method of claim 1, wherein the second distance remains constant as the radiant-energy-curable resin is deposited on the build plate.

18. The method of claim 1, wherein the pump is coupled with a discharge pipe to direct the resin from the supply container to the build surface.

19. The method of claim 1, wherein the discharge pipe extends through an opening defined by the build plate.

* * * * *